United States Patent [19]

White

[11] Patent Number: 5,072,842
[45] Date of Patent: Dec. 17, 1991

[54] ARTIFICIAL NIPPLE CONSTRUCTION

[76] Inventor: Ray D. White, 1011 Magnolia Dr., Franklin, Tenn. 37064

[21] Appl. No.: 597,517

[22] Filed: Oct. 15, 1990

[51] Int. Cl.$^5$ ............................................. A61J 11/00
[52] U.S. Cl. .................................... 215/11.4; 215/11.1
[58] Field of Search ............................ 215/11.1–11.6; 137/512.4, 560, 907; 251/210, 212

[56] References Cited

U.S. PATENT DOCUMENTS

| | | | |
|---|---|---|---|
| 167,613 | 9/1875 | Knapp | 215/11.1 |
| 2,223,179 | 11/1940 | Lougheed | 215/11.1 |
| 2,805,663 | 9/1957 | Robinson et al. | 215/11.1 |
| 3,134,495 | 5/1964 | Carbonel | 215/11.5 |
| 3,424,157 | 1/1969 | Di Paolo | 215/11.4 |
| 3,481,500 | 12/1969 | Palma | 215/11.5 |
| 3,704,803 | 12/1972 | Ponder | 215/11.4 X |
| 3,946,888 | 3/1976 | Tonkin | 215/11.5 |
| 4,821,896 | 4/1989 | Cheng | 215/11.5 X |
| 4,856,663 | 8/1989 | Epp | 215/11.1 |
| 4,993,568 | 2/1991 | Morifuji et al. | 215/11.4 X |

FOREIGN PATENT DOCUMENTS

| | | | |
|---|---|---|---|
| 63500 | 7/1892 | Fed. Rep. of Germany | 215/11.1 |
| 567265 | 10/1957 | Italy | 215/11.1 |
| 41681 | 11/1907 | Switzerland | 215/11.1 |
| 1253398 | 11/1971 | United Kingdom | 215/11.4 |
| 2169210 | 7/1986 | United Kingdom | 215/11.4 |

Primary Examiner—Sue A. Weaver
Attorney, Agent, or Firm—Leon Gilden

[57] ABSTRACT

An artificial nipple construction is arranged for mounting to an infant nursing container, wherein the nipple includes opposed concave hyperbolic side surfaces directed upwardly into a respective first and second tip, with a continuous "U" shaped slit medially positioned between the first and second tip. A modification of the invention includes at least one internal valve mechanism defined by spaced flaps opened upon suction applied to the nipple structure by an infant.

2 Claims, 4 Drawing Sheets

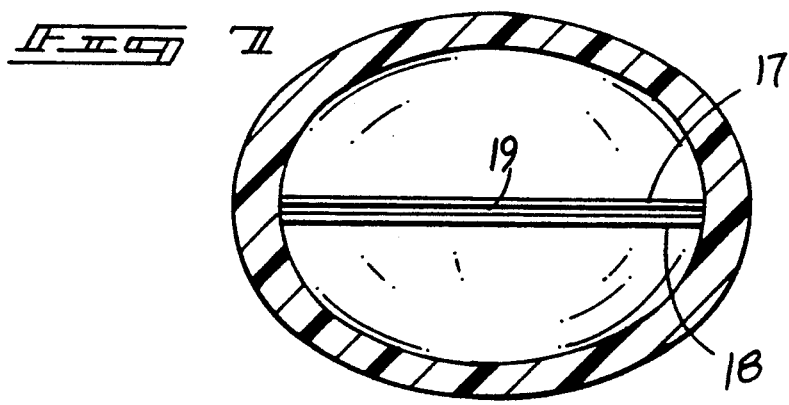
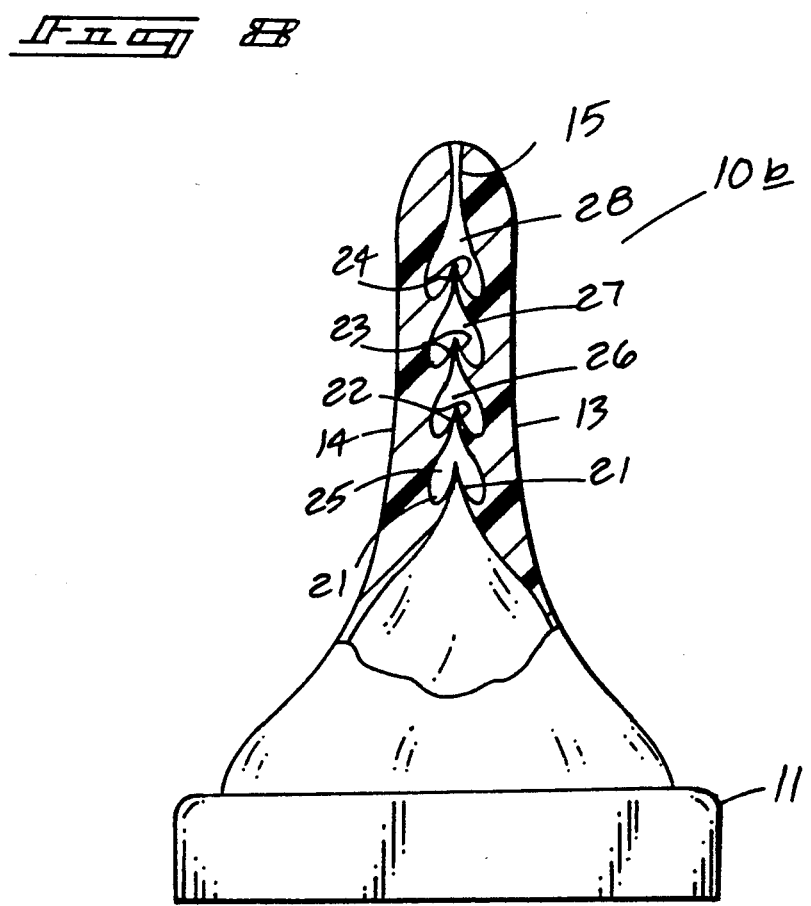

ARTIFICIAL NIPPLE CONSTRUCTION

BACKGROUND OF THE INVENTION

1. Field of the Invention

The field of invention relates to nipple members for nursing, and more particularly pertains to a new and improved artificial nipple construction wherein the same is arranged for mounting and minimizing spillage and leakage from an associated nursing container.

2. Description of the Prior Art

During the use of a nipple in a typical infant feeding situation, inadvertent positioning of the nursing instrument, other than in a vertically oriented upright position, results generally in seepage of fluid from interiorly of the nursing instrument or container. The instant invention attempts to overcome deficiencies of the prior art by providing a predisposed slit mounted between hyperbolic side walls to prevent such seepage. Prior art nipple construction may be found in U.S. Pat. No. 3,946,888 to Tonkin wherein a nipple member utilizes a valve plate underlying the nipple and overlying the opening of the container to prevent and restrict backflow of liquid into the container.

U.S. Pat. No. 4,856,663 to Epp sets forth a nipple device for use in feeding an infant with a cleft palate, wherein a duckbill shaped shield is mounted medially of a nipple member.

U.S. Pat. No. 4,821,896 to Cheng sets forth a nursing bottle formed with a liner and vent within the liner to enhance collapsing of the liner and fluid therewithin during a nursing event.

U.S. Pat. No. 3,134,495 to Carbonel sets forth a vented nursing bottle wherein a nipple-like member is mounted to a bottom surface of the bottle and permits directing of vented air interiorly of the bottle to enhance emptying of fluid within the bottle during feeding.

U.S. Pat. No. 3,481,500 to Palma sets forth a valve structure mounted coaxially about a nipple member to permit air to enter a bottle while liquid flow is directed out of the bottle to equalize pressure therewithin.

As such, it may be appreciated that there continues to be a need for a new and improved artificial nipple construction which addresses both the problems of ease of use as well as effectiveness in construction in minimizing seepage and flow from the nipple and in this respect, the present invention substantially fulfills this need.

SUMMARY OF THE INVENTION

In view of the foregoing disadvantages inherent in the known types of nipple members now present in the prior art, the present invention provides an artificial nipple construction wherein the same utilizes a side wall construction of the nipple and associated internal valving to prevent seepage and spillage of fluid from within the nursing container. As such, the general purpose of the present invention, which will be described subsequently in greater detail, is to provide a new and improved artificial nipple construction which has all the advantages of the prior art nipple members and none of the disadvantages.

To attain this, the present invention provides an artificial nipple construction arranged for mounting to an infant nursing container, wherein the nipple includes opposed concave hyperbolic side surfaces directed upwardly into a respective first and second tip, with a continuous "U" shaped slit medially positioned between the first and second tip. A modification of the invention includes at least one internal valve mechanism defined by spaced flaps opened upon suction applied to the nipple structure by an infant.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciated that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved artificial nipple construction which has all the advantages of the prior art nipple members and none of the disadvantages.

It is another object of the present invention to provide a new and improved artificial nipple construction which may be easily and efficiently manufactured and marketed.

It is a further object of the present invention to provide a new and improved artificial nipple construction which is of a durable and reliable construction.

An even further object of the present invention is to provide a new and improved artificial nipple construction which is susceptible of a low cost of manufacture with regard to both materials and labor, and which accordingly is then susceptible of low prices of sale to the consuming public, thereby making such artificial nipple constructions economically available to the buying public.

Still yet another object of the present invention is to provide a new and improved artificial nipple construction which provides in the apparatuses and methods of the prior art some of the advantages thereof, while simultaneously overcoming some of the disadvantages normally associated therewith.

Still another object of the present invention is to provide a new and improved artificial nipple construction wherein the same utilizes internal valving and configured wall construction of the nipple to prevent seepage and flow of fluid from the associated container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an orthographic view, taken along the lines 7—7 of FIG. 6, in the direction indicated by the arrows.

FIG. 8 is an orthographic side view, partially in section, of a further modified nipple utilized by the instant invention.

DESCRIPTION OF THE PREFERRED EMBODIMENT

Figure 1:
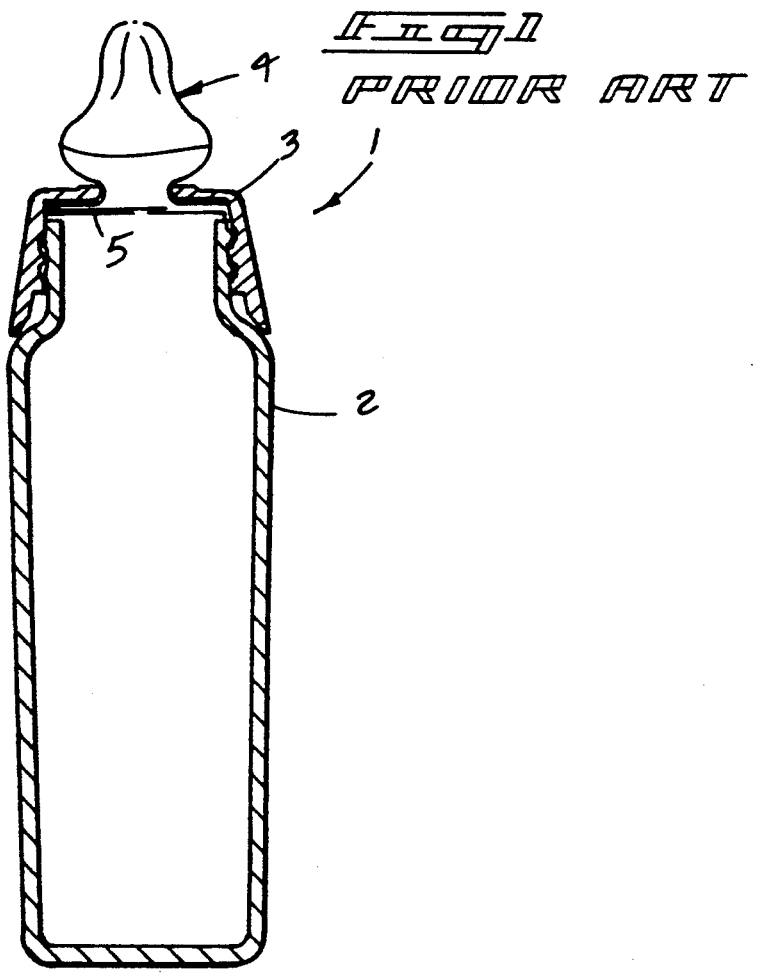
FIG. 1 is an orthographic cross-sectional illustration of a prior art artificial nipple and container member.

With reference now to the drawings, and in particular to FIGS. 1 to 8 thereof, a new and improved artificial nipple construction embodying the principles and concepts of the present invention and generally designated by the reference numeral 10 will be described.

FIG. 1 illustrates a prior art nipple member 1, wherein a nipple 4 is mounted within a cap 3 and utilizes a one way vavlve plate 5 underlying the nipple within the cap to prevent back flow of fluid from the nipple into the container, in a manner as set forth in U.S. Pat. No. 3,946,888.

Figure 2:
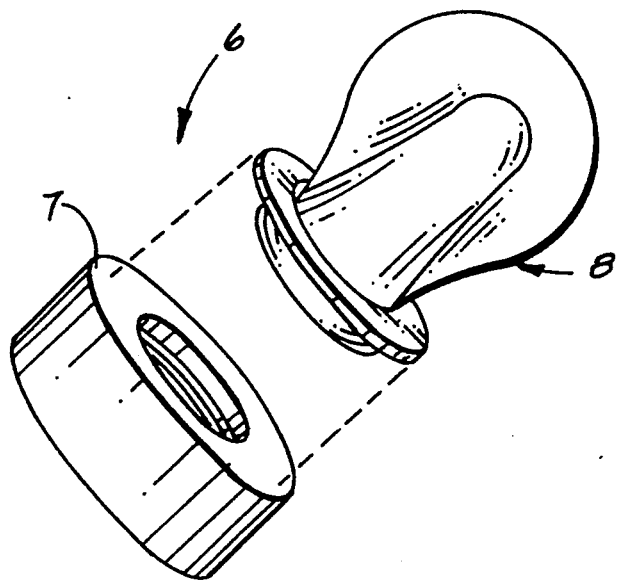
FIG. 2 is an isometric illustration of a further example of a prior art nipple construction.
Figure 3:
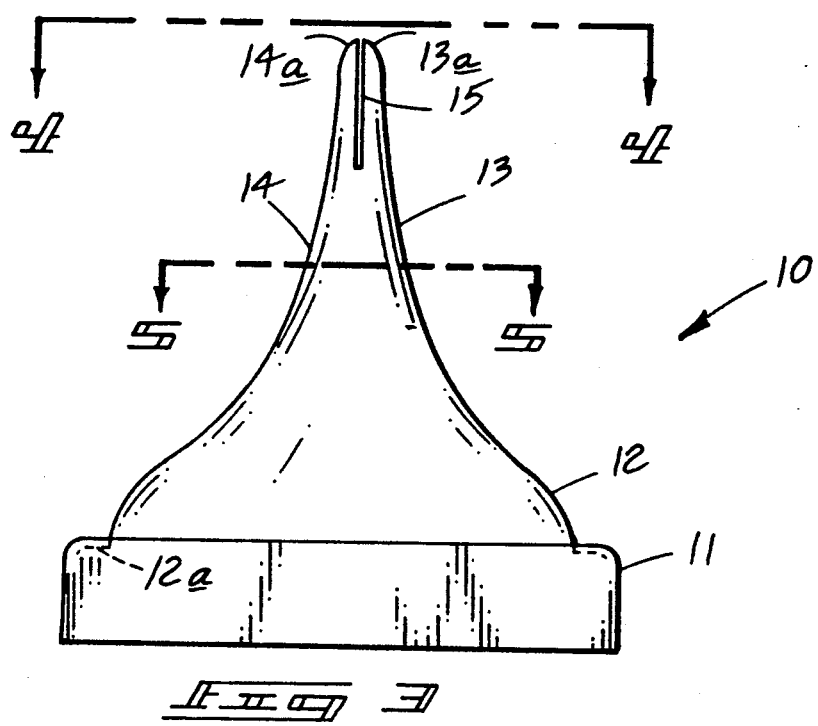
FIG. 3 is an orthographic side view, taken in elevation, of the instant invention.
Figure 4:
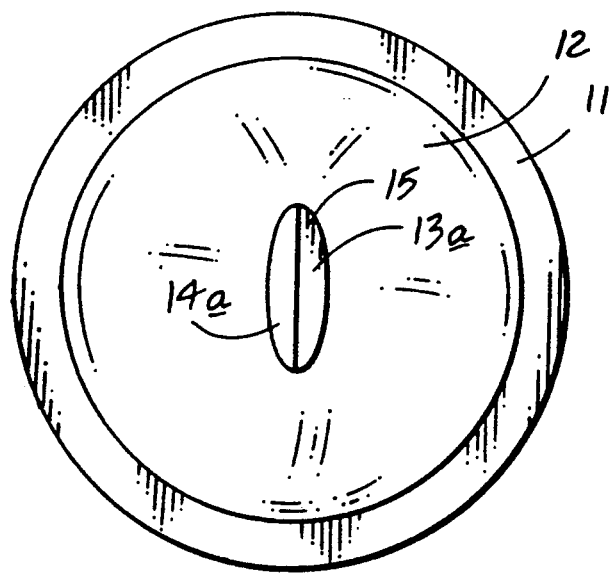
FIG. 4 is an orthographic top view of the instant invention.
Figure 5:
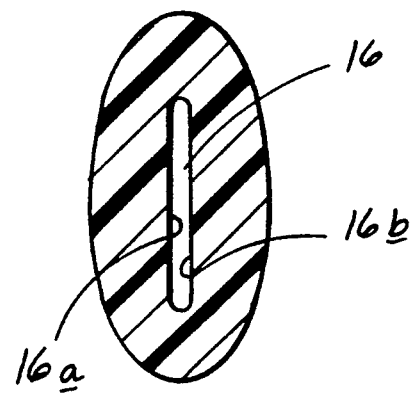
FIG. 5 is an orthographic view, taken along the lines 5—5 of FIG. 3, in the direction indicated by the arrows.

FIG. 2 illustrates a further prior art nipple construction member 6 mounted to a cap 7, wherein a duck bill plate 8 mounts a nipple member therewithin for providing adequate suction and grasping thereof by an infant with a cleft palate, in a manner as set forth in U.S. Pat. No. 4,856,663.

More specifically, the artificial nipple construction 10 of the instant invention essentially comprises a cylindrical base member 11 that may be integrally mounted to an annular nipple base 12 or include an annular flange 12a for securement to the cylindrical base member 11 in an acceptable fashion, such as set forth in FIG. 2 of the prior art. The annular nipple base 12 includes opposed first and second concave sides 13 and 14 respectively, terminating in an upper first and second respective tip 13a and 14a of each respective first and second side 13 and 14. A continuous "U" shaped slit 15 is medially positioned and directed between the first and second tip 13a and 14a. In this manner, the "U" shaped slit is normally biased to a closed position subsequent to oral suction pressure applied interiorly of the nipple member in use during a nursing procedure. It is understood that the cylindrical base member 11 is arranged for mounting to a nursing container of a type as ser forth in FIG. 1 for example.

Figure 6:
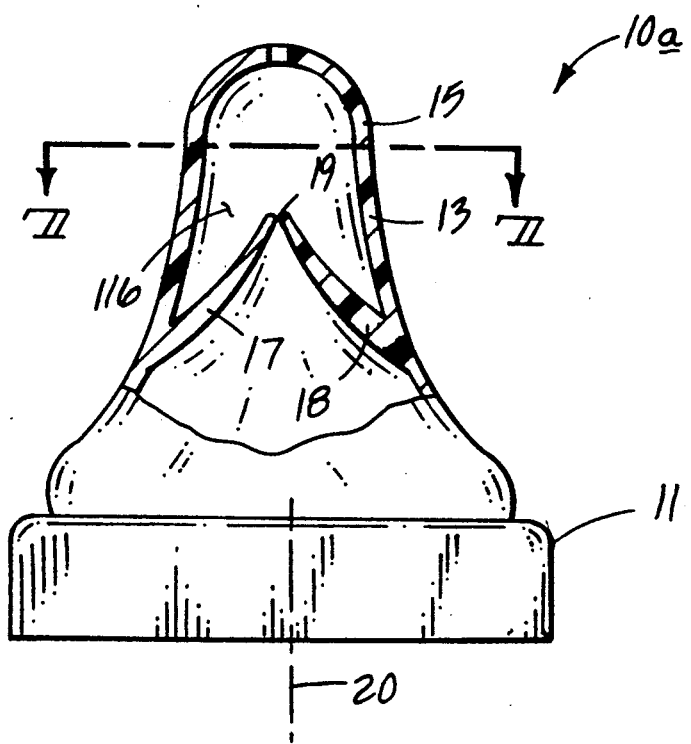
FIG. 6 is an orthographic view, partially in section, of a modified nipple construction utilized by the instant invention.

FIG. 6 illustrates a modified nipple member 10a, including a first and second flap 17 and 18 mounted to an interior surface of each first and second side 13 and 14 respectively. Each flap extends upwardly to define a contact line. 19 continuously directed orthogonally to the axis 20 of the nipple member to function as a valve member preventing additional fulid from entering a fluid reservoir 116 defined between the first and second flaps 17 and 18 and the "U" shaped slit 15. This is in contradistinction to the reservoir 16 that is defined interiorly of the first and second sides 13 and 14 of FIG. 3. that includes first and second convex interior wall surfaces 16a and 16b respectively that extends coextensively throughout the nipple member.

FIG. 8 illustrates the use of a further modified nipple member 10b that includes a respective first, second, third, and fourth flap pair 21, 22, 23, and 24 respectively that defines a first reservoir cavity 25 between the first and second flap pair, a second reservoir cavity 26 between the second and third flap pair a third reservoir cavity 27 between the third and fourth flap pair 23 and 24, and a fourth reservoir 28 between the fourth flap pair 24 and the "U" shaped slit 15. The coaxially aligned flap pairs and associated reservoir cavities provide safety valves for preventing undesired flow directed therethrough, and each include, as is understood, a contact line 19 between each of the flap pairs 21 through 24, wherein each of the contact lines are arranged parallel relative to one another and orthogonal to an axis of the nipple construction 10b.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Futher, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An artificial nipple construction comprising,
   a cylindrical base member, the cylindrical base member including an annular nipple base mounted thereto, the annular nipple base including a concave first side and a concave second side, the concave first and second sides arranged diametrically opposed relative to one another to the annular nipple base, and converge upwardly to a respective first upper tip and a second upper tip, the first and second upper tips including a continuous "U" shaped slit positioned therebetween, and wherein the first and second sides are each of a hyperbolic configuration converging towards one another, and wherein the first side includes a first flap fixedly mounted to an interior surface of the first side, and a second flap fixedly mounted to an interior surface of the second side, the first and second flap converged towards one another at a continuous contact line, the contact line orthogonally oriented relative to an axis of the nipple member, and wherein the first and second flaps are of a flexible construction and effects spreading of the first and second flap pairs upon application of a suction interiorly of the nipple member, and wherein the first and second flaps define a first flap pair, and further including a second flap pair mounted overlying the first flap pair, a third flap pair overlying the second flap pair, and a fourth flap pair overlying the third flap pair, and a first reservoir defined between the first and second flap pair, a second reservoir defined between the second and third flap pair, a third reservoir defined between the third and fourth flap pair, and a fourth reservoir defined between the fourth flap paid and the "U" shaped slit.

2. An apparatus as set forth in claim 1 wherein each flap pair includes a contact line defining convergence of each flap of each flap pair, and each contact line is arranged parallel relative to one another.

* * * * *